United States Patent
Chiang

(10) Patent No.: US 7,745,280 B2
(45) Date of Patent: Jun. 29, 2010

(54) METAL-INSULATOR-METAL CAPACITOR STRUCTURE

(75) Inventor: Yu-Ho Chiang, Taichung (TW)

(73) Assignee: United Microelectronics Corp., Hsin-Chu (TW)

( * ) Notice: Subject to any disclaimer, the term of this patent is extended or adjusted under 35 U.S.C. 154(b) by 106 days.

(21) Appl. No.: 12/129,672

(22) Filed: May 29, 2008

(65) Prior Publication Data

US 2009/0293247 A1 Dec. 3, 2009

(51) Int. Cl.
*H01L 21/8242* (2006.01)
*H01L 21/20* (2006.01)
*H01L 21/44* (2006.01)

(52) U.S. Cl. .................. 438/239; 438/240; 438/381; 438/393; 438/396; 438/687; 257/E21.006; 257/E21.008; 257/E21.011; 257/E21.582

(58) Field of Classification Search .......... 257/E21.006, 257/E21.008, E21.011, E21.582
See application file for complete search history.

(56) References Cited

U.S. PATENT DOCUMENTS

| 6,699,749 | B1 | 3/2004 | Lee | |
|---|---|---|---|---|
| 6,730,573 | B1 | 5/2004 | Ng | |
| 2006/0160299 | A1* | 7/2006 | Rao et al. | 438/250 |
| 2007/0111431 | A1* | 5/2007 | Engelhardt et al. | 438/253 |
| 2007/0145526 | A1* | 6/2007 | Kim | 257/532 |

* cited by examiner

*Primary Examiner*—Charles D Garber
*Assistant Examiner*—Mohsen Ahmadi
(74) *Attorney, Agent, or Firm*—Winston Hsu

(57) ABSTRACT

A metal-insulator-metal capacitor structure includes a lower electrode, a buffer layer, a barrier layer, a dielectric layer and an upper electrode. The lower electrode is disposed in the buffer layer. The barrier layer covers part of the lower electrode and is disposed between the lower electrode and the upper electrode. The buffer layer serves as an etching stop layer to define the dielectric layer. The dielectric layer in the metal-insulator-metal capacitor structure has a uniform and ideal thickness.

17 Claims, 5 Drawing Sheets

METAL-INSULATOR-METAL CAPACITOR STRUCTURE

BACKGROUND OF THE INVENTION

1. Field of the Invention

The present invention relates to a metal-insulator-metal (MIM) capacitor structure and a method for making the same. In particular, the present invention relates to a metal-insulator-metal (MIM) capacitor structure and a method for making the same with a better dielectric layer thickness.

2. Description of the Prior Art

In the semiconductor manufacturing process, the metal-insulator-metal (MIM) capacitor structures made of metal layer/insulator layer/metal layer composite structure have been widely used in the design of the ultra large scale integration (ULSI) because such metal capacitors have lower electrical resistance, smaller parasitic capacitance and no induced voltage shift, so most metal capacitors are made of the metal-insulator-metal structure.

Structurally speaking, the metal-insulator-metal (MIM) capacitor includes a capacitance insulator layer, such as a dielectric layer, disposed between the lower electrode plate and the upper electrode plate. Generally, the metal-insulator-metal (MIM) capacitor occupies a great deal of space on the chip. In order to increase the capacitance integration and to lower the cost, the metal-insulator-metal (MIM) capacitor is supposed to move toward higher capacitance density to enhance the circuit density. One of the possible fashions to increase the capacitance density of the metal-insulator-metal (MIM) capacitor is to decrease the thickness of the dielectric layer. Nevertheless, such solution may likely trigger another problem, such as unacceptably high leak current.

U.S. Pat. No. 6,699,749 discloses a method for making a metal-insulator-metal capacitor. The dielectric layer serving as the capacitance insulator layer may be also used as the etching-stop layer to define the upper electrode plate during the process. The dielectric layer must be thick enough because the dielectric layer serving as the etching-stop layer will be inevitably damaged by the etching and the thickness of the dielectric layer decreases. This scenario obviously goes against what is originally needed.

U.S. Pat. No. 6,730,573 also discloses a method for making a metal-insulator-metal capacitor. A copper layer is used as the etching-stop layer, and all the copper layers which include the metal electrodes and the metal wires for use in the MIM capacitor structure are exposed after etching is completed. Afterwards, a thin barrier layer is disposed on all the exposed copper layers. The material of the barrier layer is selected from Ta, Al, W, TaN and TiN. Because a barrier layer is disposed on all the copper regions, the copper regions serving as conductive wires would have much higher electrical resistance and have adverse effect on the circuit performance.

Therefore, a novel metal-insulator-metal (MIM) capacitor structure and a method for making the same are needed. Such novel metal-insulator-metal (MIM) capacitor structure should have better dielectric layer thickness and maintain a lower electric resistance of the circuits.

SUMMARY OF THE INVENTION

The present invention accordingly provides a metal-insulator-metal (MIM) capacitor structure and a method for making the same to overcome the above-mentioned problems.

The present invention first provides metal-insulator-metal (MIM) capacitor structure, including a first metal layer and a conductor layer disposed in a substrate, a patterned buffer layer covering the first metal layer and the conductor layer and having a first opening to expose the first metal layer, a second metal layer disposed in the first opening, the second metal layer and the first metal layer together forming a lower electrode plate, a barrier layer disposed on the second metal layer and covering part of the patterned buffer layer, a dielectric layer disposed on the barrier layer, an upper electrode plate disposed on the dielectric layer, and a passivation layer covering the upper electrode plate and the patterned buffer layer.

The present invention again provides a method for manufacturing a metal-insulator-metal (MIM) capacitor structure. First, a substrate including a first metal and a conductive layer is provided. Later a patterned buffer layer is formed to cover the first metal and the conductive layer, wherein the patterned buffer layer has a first opening to expose the first metal. Afterwards, the first opening is filled with a second metal so that the second metal and the first metal together form a lower electrode plate. Later a barrier layer is formed to cover the second metal and the patterned buffer layer. Afterwards, a dielectric layer is formed to cover the barrier layer. Then an upper electrode plate layer is formed to cover the dielectric layer. Later, the upper electrode plate layer, the dielectric layer and the barrier layer are selectively removed to expose the patterned buffer layer and form an upper electrode plate, wherein the barrier layer covers part of the patterned buffer layer. Then a passivation layer is formed to cover the upper electrode plate, the dielectric layer, the barrier layer and the patterned buffer layer.

The present invention accordingly provides a metal-insulator-metal (MIM) capacitor structure and a method for making the same. In this novel metal-insulator-metal (MIM) capacitor structure, an additional buffer layer is employed to replace the conventional dielectric layer to serve as the etching-stop layer when defining the upper electrode, so that the dielectric layer in the novel metal-insulator-metal (MIM) capacitor structure has a uniform and ideal thickness. On the other hand, in the novel metal-insulator-metal (MIM) capacitor structure, the barrier layer is selectively disposed in the metal-insulator-metal (MIM) capacitor structure on the copper regions serving as electrical plates to maintain an electrical resistance as low as possible.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
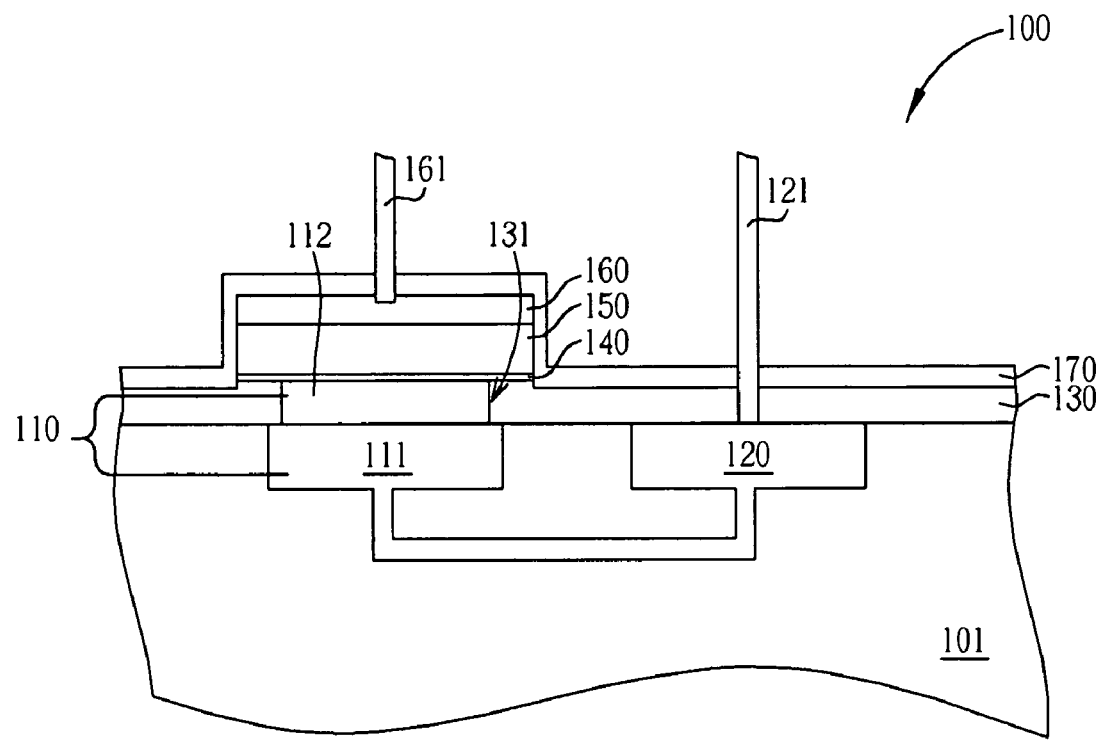
FIG. 1 illustrates a preferred embodiment of the metal-insulator-metal (MIM) capacitor structure of the present invention.

FIG. 1 illustrates a preferred embodiment of the metal-insulator-metal (MIM) capacitor structure of the present invention. The metal-insulator-metal (MIM) capacitor structure 100 of the present invention includes a substrate 101, a first metal layer 111 and a second metal layer 112 together forming a lower electrical plate 110, a wire layer 120, a patterned buffer layer 130, a barrier layer 140, a dielectric layer 150, an upper electrical plate 160 and a passivation layer 170. The wire layer 120 and the upper electrical plate 160 may be respectively electrically connected to a via plug 121/161 serving as interconnects.

The first metal layer 111 and the wire layer 120 are disposed in the substrate 101. Optionally, the first metal layer 111 and the wire layer 120 may be electrically connected or insulated. FIG. 1 illustrates that the first metal layer 111 and the wire layer 120 are electrically connected. The substrate 101 may be a semiconductor substrate, such as Si. At least an insulating layer is disposed thereon, and the first metal layer 111 and the wire layer 120 are disposed in the insulating layer. Besides, there may be other additional elements, such as semiconductor elements or other material layers, electrically connected to the first metal layer 111 and the wire layer 120 in the substrate 101.

A patterned buffer layer 130 on the first metal layer 111 and the wire layer 120 may generally cover the first metal layer 111 and the wire layer 120. The patterned buffer layer 130 may usually include a nitride, such as a silicon nitride with a thickness of 650 Å~750 Å for example. The patterned buffer layer 130 on one hand may accommodate the second metal layer 112 of the lower electrode plate 110, and on the other hand may serve as the etching-stop layer to buffer the damage of the etching step during the definition of the upper electrode 160 to enlarge the process window. The patterned buffer layer 130 has an optional first opening 131 to expose the first metal layer 111. The first opening 131 is useful in accommodating the second metal layer 112. The first opening 131 may be formed by the lithographic and etching procedures conventionally.

The second metal layer 112 fills the first opening 131. The first opening 131 may be filled with the second metal layer 112 by the conventional electrode-plating or electrodeless-plating procedures. A chemical mechanical planarization (CMP) may be optionally employed to planarize the surface of the second metal layer 112 after the second metal layer 112 fills the first opening 131. After the second metal layer 112 fills the first opening 131, the second metal layer 112 and the first metal layer 111 together form the lower electrode plate 110 of the metal-insulator-metal (MIM) capacitor structure 100 of the present invention. Preferably, the second metal layer 112 may be slightly smaller than the first metal layer 111.

Above the lower electrode plate 110, the barrier layer 140 is disposed on the second metal layer 112. At least, the barrier layer 140 covers part of the underlying patterned buffer layer 130. Preferably, the barrier layer 140 may be slightly larger than the underlying second metal layer 112 and covers part of the patterned buffer layer 130 to ensure that the barrier layer 140 covers the second metal layer 112 as much as possible. Materials such as TaN, Ta, TiN and a combination thereof may be used to form the barrier layer 140. The barrier layer 140 is useful in preventing the metal atoms in the lower electrode plate 110 from diffusion.

The dielectric layer 150 of the metal-insulator-metal (MIM) capacitor structure 100 of the present invention is disposed on the barrier layer 140. The dielectric layer 150 may be made of the single materials such as silicon oxide, silicon nitride, a high K material or a combination thereof, or composite materials such as oxide-nitride-oxide (ONO). The thickness of the dielectric layer 150 is optional. A thinner dielectric layer 150 may usually result in a higher capacitance.

The upper electrode plate 160 is disposed on the dielectric layer 150. Besides, there is a passivation layer 170 entirely covering the upper electrode plate 160 and the patterned buffer layer 130. The passivation layer 170 and the patterned buffer layer 130 may have openings to accommodate the via plugs 121/161, which serve as interconnects, of the wire layer 120 and the upper electrical plate 160. Conductive materials such as Al, Ti, TiN or a combination thereof may be used to form the upper electrical plate 160. The passivation layer 170 may usually include a nitride, such as silicon nitride.

Preferably, the location of the upper electrode plate 160, the dielectric layer 150 and the barrier layer 140 may be defined by means of one single etching step. For example, after the barrier layer 140, the dielectric layer 150 and the upper electrode plate layer are formed on the patterned buffer layer 130, the barrier layer 140, the dielectric layer 150 and the upper electrode plate 160 may be defined by the lithographic and etching procedure in combination with a reticle to have the same area. Because in the present stage the patterned buffer layer 130 is used as the etching-stop layer, the drawbacks such as the dielectric layer being too thick found in U.S. Pat. No. 6,699,749 may be avoided, and the capacitance dielectric layer in the MIM capacitor structure of the present invention may have optimal thickness. Besides, the optimal thickness of the dielectric layer may also meet the demand of a smaller thickness.

The first metal layer 111, the second metal layer 112, the wire layer 120, the upper electrical plate 160 and the via plugs 121/161 are usually made of a conductive material. For example, the first metal layer 111, the second metal layer 112 and the wire layer 120 may include copper. The upper electrical plate 160 may include Al, Ti or TiN.

Figure 2:
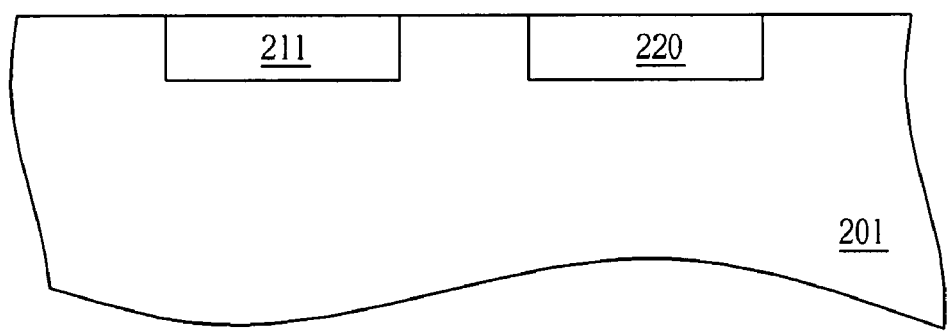
FIGS. 2-10 illustrates a preferred embodiment of the method for manufacturing the metal-insulator-metal (MIM) capacitor structure of the present invention.

The present invention still provides a method for manufacturing a novel metal-insulator-metal (MIM) capacitor structure. FIGS. 2-10 illustrates a preferred embodiment of the method for manufacturing the metal-insulator-metal (MIM) capacitor structure of the present invention. First, as shown in FIG. 2, a substrate 201 is provided. The substrate 201 includes a first metal 211 and a wire layer 220. Optionally, the first metal 211 and the wire layer 220 may be electrically connected or insulated. FIG. 2 illustrates that the first metal 211 and the wire layer 220 are electrically insulated. The substrate 201 may be a semiconductor substrate, such as Si. At least an insulating layer (not shown) is disposed thereon, and the first metal 211 and the wire layer 220 are disposed in the insulating layer. Besides, there may be other additional elements, such as semiconductor elements or other material layers, electrically connected to the first metal 211 and the wire layer 220 in the substrate 201.

Figure 3:
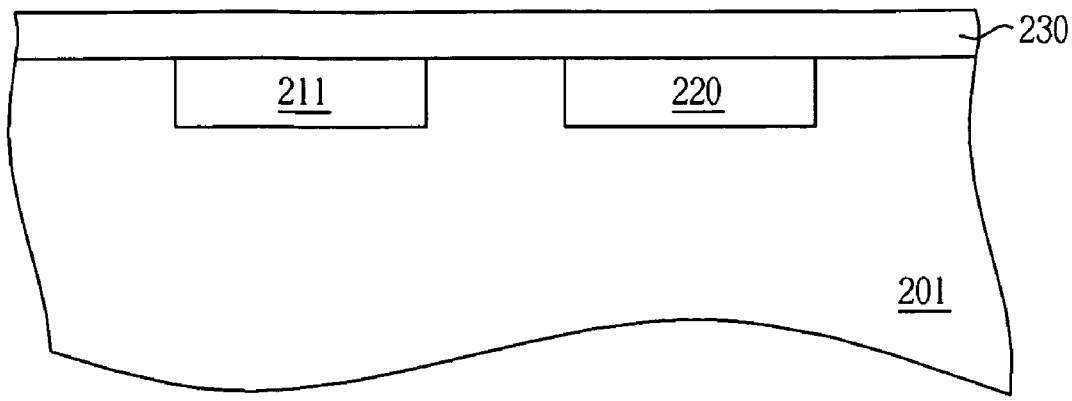
Figure 4:
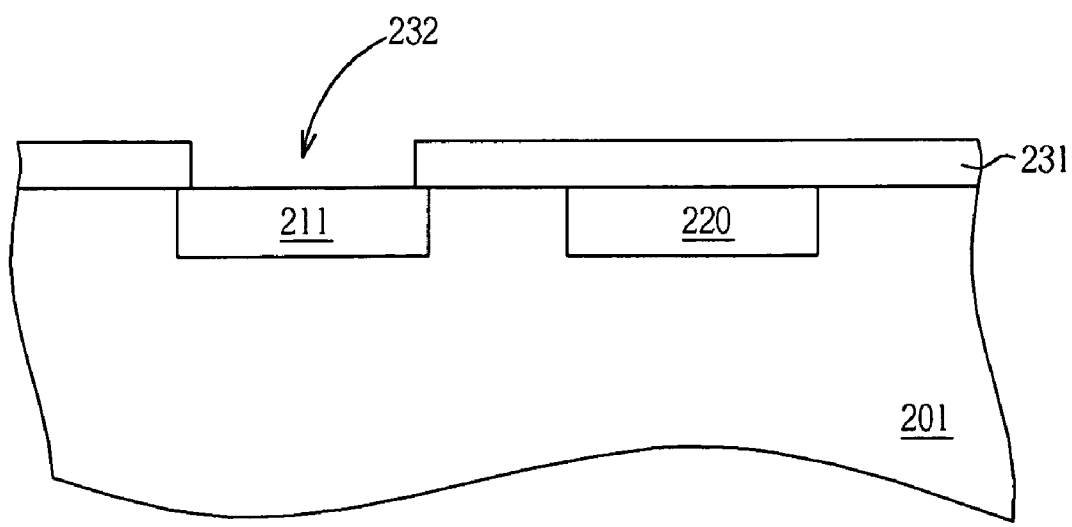

Later, as shown in FIG. 3, a buffer layer 230 is deposited to cover the first metal 211, the wire layer 220 and the substrate 201. Then, as shown in FIG. 4, the buffer layer 230 is patterned, so that the patterned buffer layer 231 has a first opening 232 to selectively expose the first metal 211. Preferably, the first opening 232 of the patterned buffer layer 231 merely exposes part of the first metal 211 without exposing the wire layer 220. Besides, the first opening 232 may be slightly smaller/narrower than the first metal 211. The first opening 232 may be formed by patterning the buffer layer 230 by means of the lithographic and etching procedures conventionally.

Please note that the buffer layer 230 after the patterning procedure on one hand may accommodate the second metal layer of the lower electrode plate, and on the other hand may serve as an etching-stop layer to buffer the etching damage so as to increase the process window. Accordingly, the etching rate of the buffer layer 230 may be preferably different from that of the upper electrode plate, the lower electrode plate and the barrier layer. For example, the buffer layer 230 may be made of a material such as silicon nitride with a thickness of 900 Å~1100 Å by chemical vapor deposition.

Figure 5:
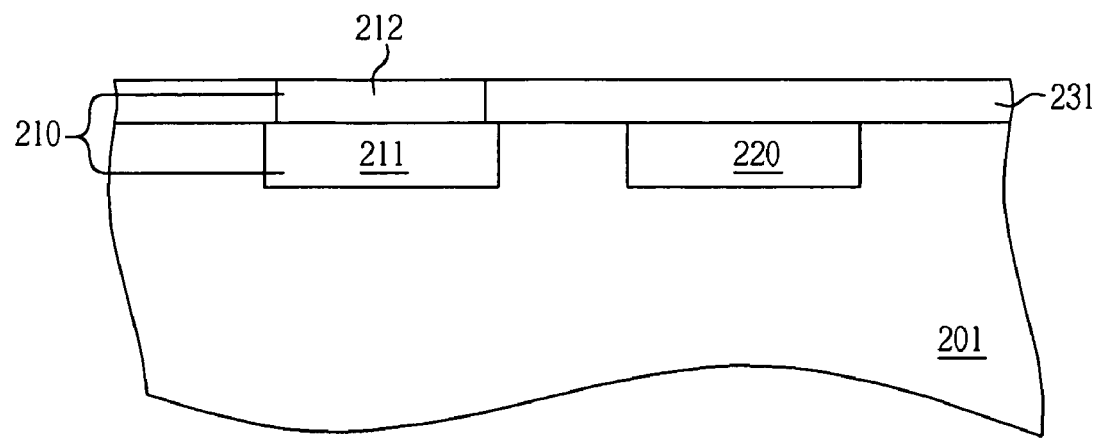

Afterwards, as shown in FIG. 5, the first opening 232 is substantially filled with a second metal 212 so that the second metal 212 and the first metal 211 together form a lower electrode plate 210. The first opening 232 may be filled with a second metal 212 by the electrode-plating or electrodeless-plating procedures conventionally. A chemical mechanical planarization (CMP) may be optionally employed to planarize the surface of the second metal layer 212 after the second metal 212 fills the first opening 232 to facilitate the formation of the following layers. Because the first opening 232 exposes the first metal 211, the second metal 212 and the first metal 211 together form the lower electrode plate 210 of the metal-insulator-metal (MIM) capacitor structure 200 of the present invention after the second metal 212 fills the first opening 232.

Figure 6:
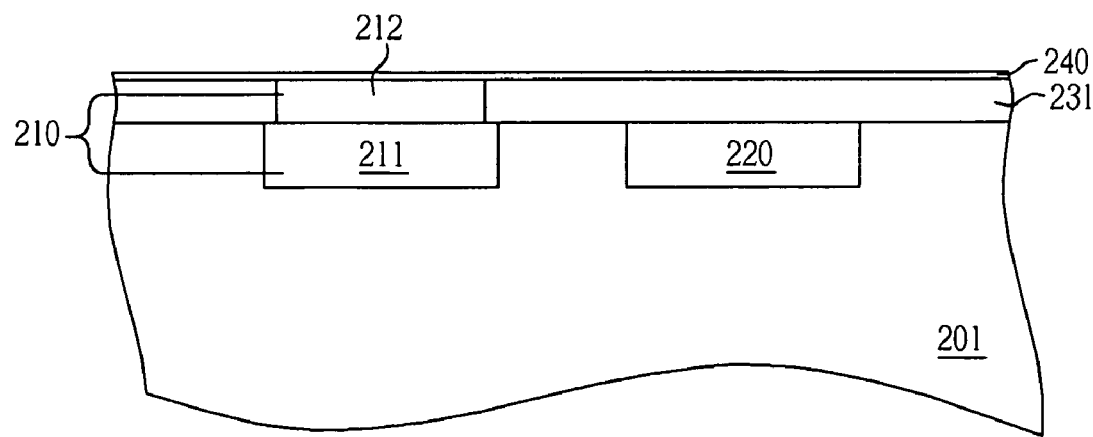

Later, as shown in FIG. 6, a barrier layer 240 is formed to entirely cover the second metal 212 and the patterned buffer layer 231. Materials such as TaN, Ta, TiN or a combination thereof by means of chemical vapor deposition (CVD), physical vapor deposition (PVD) or atomic layer deposition (ALD) may be used to form the barrier layer 240 with a thickness of 450 Å~550 Å. The barrier layer 240 is useful in preventing the metal atoms in the lower electrode plate 210 from diffusion.

Figure 7:
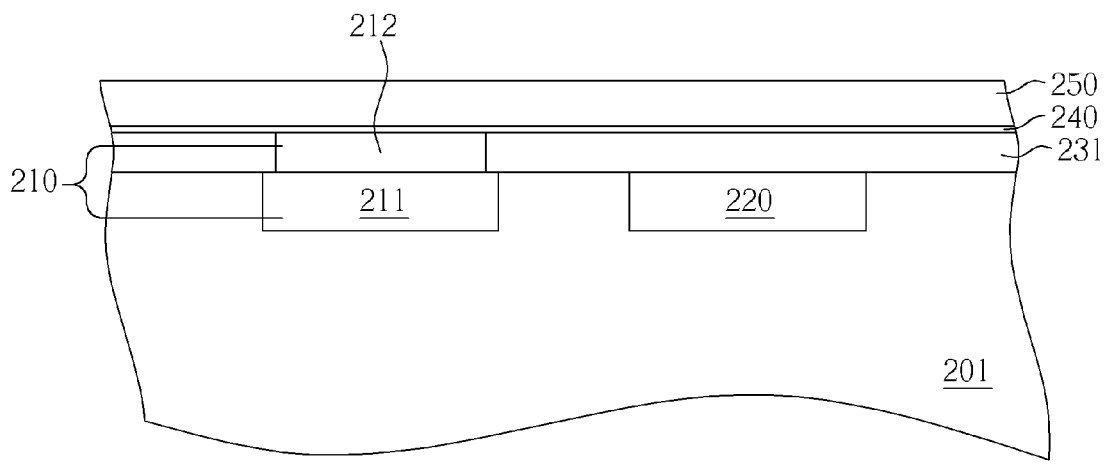

Afterwards, as shown in FIG. 7, a dielectric layer 250 is formed to cover the barrier layer 240. The dielectric layer 250 may be made of the single materials such as silicon oxide, silicon nitride, a high K material or a combination thereof, or composite materials such as oxide-nitride-oxide (ONO) by deposition, oxidation or nitridation with a thickness of 250 Å~350 Å. The thickness of the dielectric layer 250 is optional. A thinner dielectric layer 250 may usually result in a higher capacitance.

Figure 8:
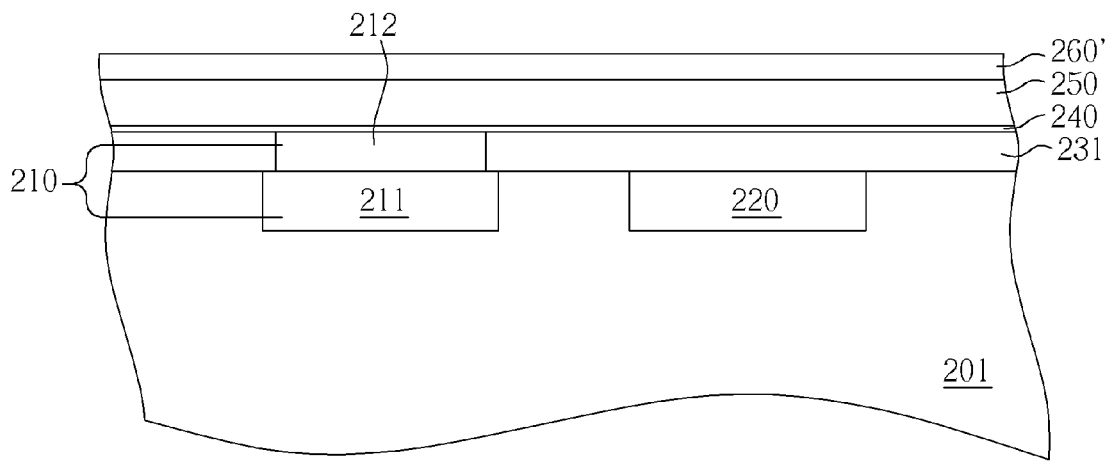
Figure 9:
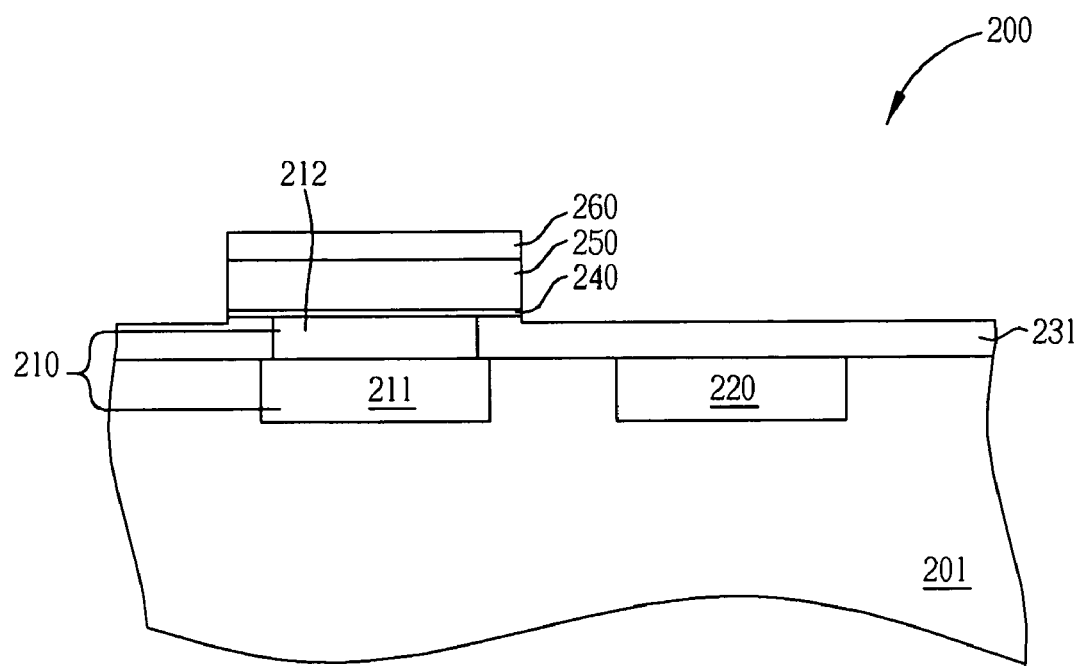

Then, as shown in FIG. 8, an upper electrode plate layer 260' is formed to cover the dielectric layer 250. The upper electrode plate layer 260' may be made of conductive materials such as Al, Ti, TiN or a combination thereof. Afterwards, as shown in FIG. 9, the upper electrode plate layer 260', the dielectric layer 250 and the barrier layer 240 are selectively removed to expose the underlying patterned buffer layer 231 to define the location of the upper electrode plate 260. Preferably, the barrier layer 240 may be slightly larger/wider than the underlying second metal 212 and covers part of the patterned buffer layer 231 to ensure that the barrier layer 240 covers the second metal 212 as much as possible. At least the barrier layer 240 covers part of the underlying patterned buffer layer 231.

Preferably, the location of the upper electrode plate 260, the dielectric layer 250 and the barrier layer 240 may be defined by means of one single etching step. For example, after the barrier layer 240, the dielectric layer 250 and the upper electrode plate layer 260' are formed, the barrier layer 240, the dielectric layer 250 and the upper electrode plate 260 may be defined by the lithographic and etching procedure in combination with one reticle to have the same area. Because in the present stage the patterned buffer layer 231 is used as the etching-stop layer, the drawbacks such as the dielectric layer being too thick may be avoided adversely affecting the capacitance density.

Figure 10:
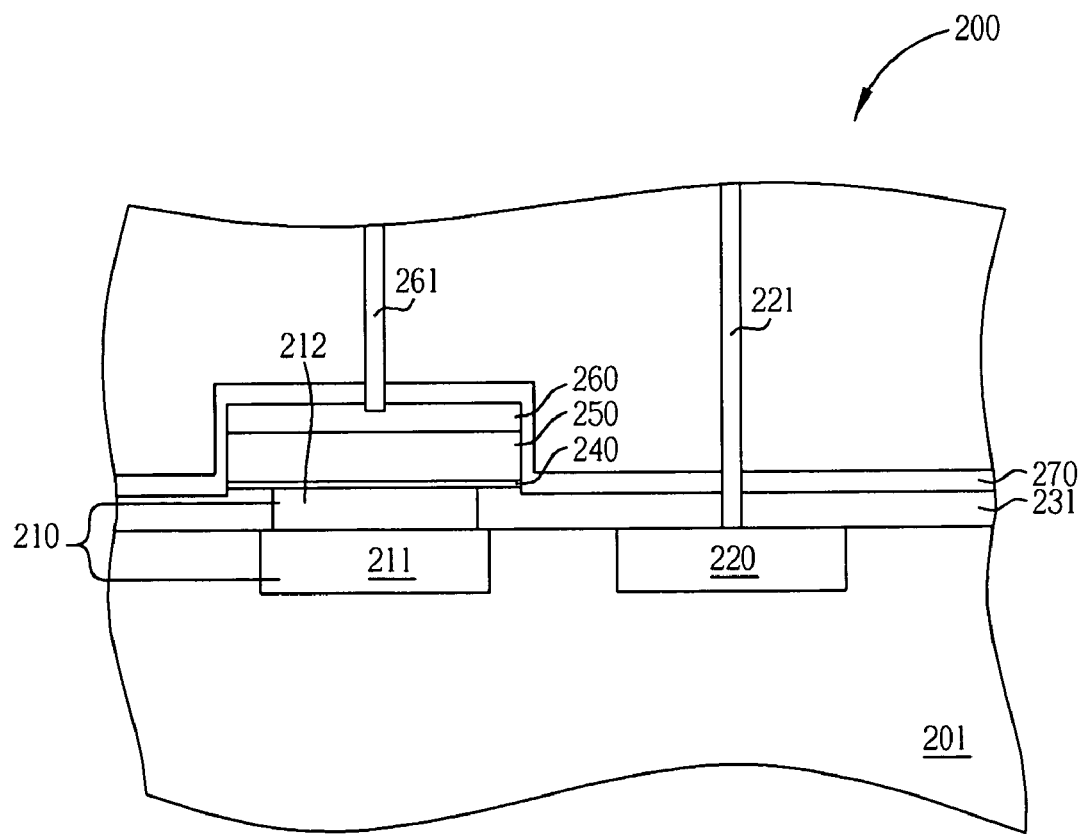

Then, as shown in FIG. 10, a passivation layer 270 is formed to entirely cover the upper electrode plate 260, the dielectric layer 250, the barrier layer 240 and the patterned buffer layer 231 to complete the metal-insulator-metal (MIM) capacitor structure 200 of the present invention. The passivation layer 270 may usually include a nitride, such as silicon nitride.

Still, the passivation layer 270 and the patterned buffer layer 231 may be selectively removed to expose the wire layer 220 and the upper electrode plate 260 and to form additional openings to accommodate the via plugs 221/261 serving as interconnects, as shown in FIG. 10. The first metal 211, the second metal 212, the wire layer 220, the upper electrical plate 260 and the via plugs 221/261 are usually made of a conductive material. For example, the first metal 211, the second metal 212 and the wire layer 220 may include copper. The upper electrical plate 260 may include Al, Ti or TiN.

In this novel metal-insulator-metal (MIM) capacitor structure of the present invention, an additional buffer layer is employed to replace the conventional dielectric layer to serve as the etching-stop layer, so that the dielectric layer in the novel metal-insulator-metal (MIM) capacitor structure has a uniform and ideal thickness. On the other hand, in the novel metal-insulator-metal (MIM) capacitor structure, the barrier layer is selectively disposed in the metal-insulator-metal (MIM) capacitor structure on the copper regions serving as electrical plates to maintain an electrical resistance as low as possible.

Those skilled in the art will readily observe that numerous modifications and alterations of the device and method may be made while retaining the teachings of the invention.

What is claimed is:

1. A metal-insulator-metal (MIM) capacitor structure, comprising:
    a substrate;
    a first metal layer and a conductor layer disposed in said substrate;
    a patterned buffer layer covering said first metal layer and said conductor layer and having a first opening to expose said first metal layer;
    a second metal layer disposed in said first opening, and said second metal layer and said first metal layer together forming a lower electrode plate;
    a barrier layer disposed on said second metal layer and covering part of said patterned buffer layer, wherein the area barrier layer is larger than that of said second metal layer;
    a dielectric layer disposed on said barrier layer;
    an upper electrode plate disposed on said dielectric layer; and
    a passivation layer covering said upper electrode plate and said patterned buffer layer.

2. The metal-insulator-metal (MIM) capacitor structure of claim 1, wherein said conductive layer, said first metal layer and said second metal layer comprise copper.

3. The metal-insulator-metal (MIM) capacitor structure of claim 1, wherein said patterned buffer layer comprises a nitride.

4. The metal-insulator-metal (MIM) capacitor structure of claim 1, wherein said conductive layer is electrically connected to said first metal layer.

5. The metal-insulator-metal (MIM) capacitor structure of claim 1, wherein said barrier layer is selected from a group consisting of TaN, Ta, TiN and a combination thereof.

6. The metal-insulator-metal (MIM) capacitor structure of claim 1, wherein said barrier layer and said upper electrode plate are of the same area size.

7. The metal-insulator-metal (MIM) capacitor structure of claim 1, wherein said dielectric layer is selected from a group consisting of silicon oxide, silicon nitride, a high K material and a combination thereof.

8. The metal-insulator-metal (MIM) capacitor structure of claim 1, wherein said upper electrode plate is selected from a group consisting of Al, Ti, TiN and a combination thereof.

9. The metal-insulator-metal (MIM) capacitor structure of claim 1, wherein said passivation layer comprises a nitride.

10. A method for manufacturing a metal-insulator-metal (MIM) capacitor structure, comprising:

providing a substrate comprising a first metal and a conductive layer;

forming a patterned buffer layer covering said first metal and said conductive layer, wherein said patterned buffer layer has a first opening to expose said first metal;

filling said first opening with a second metal so that said second metal and said first metal together form a lower electrode plate;

forming a barrier layer to cover said second metal and said patterned buffer layer;

forming a dielectric layer to cover said barrier layer;

forming an upper electrode plate layer to cover said dielectric layer;

selectively removing said upper electrode plate layer, said dielectric layer and said barrier layer by a lithographic and etching procedure to expose said patterned buffer layer and form an upper electrode plate, wherein said barrier layer covers part of said patterned buffer layer; and forming a passivation layer to cover said upper electrode plate, said dielectric layer, said barrier layer and said patterned buffer layer.

11. The method of claim 10, further comprising:

selectively removing said passivation layer and said patterned buffer layer to expose part of said upper electrode plate and part of said conductive layer.

12. The method of claim 10, wherein said first metal is electrically connected to said conductive layer.

13. The method of claim 10, wherein said buffer layer comprises a nitride.

14. The method of claim 10, wherein said conductive layer, said first metal and said second metal comprise copper and said barrier layer is selected from a group consisting of TaN, Ta, TiN and a combination thereof.

15. The method of claim 10, wherein said dielectric layer is selected from a group consisting of silicon oxide, silicon nitride, a high K material and a combination thereof.

16. The method of claim 10, wherein said upper electrode plate is selected from a group consisting of Al, Ti, TiN and a combination thereof.

17. The method of claim 10, wherein said passivation layer comprises a nitride.

* * * * *